(12) United States Patent
Easley et al.

(10) Patent No.: US 7,472,696 B2
(45) Date of Patent: Jan. 6, 2009

(54) EXHAUST GAS RECIRCULATION SYSTEM WITH IN-CYLINDER VALVE ACTUATION

(75) Inventors: William L. Easley, Dunlap, IL (US); James J. Faletti, Spring Valley, IL (US); George E. Donaldson, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 25 days.

(21) Appl. No.: 11/394,120

(22) Filed: Mar. 31, 2006

(65) Prior Publication Data

US 2007/0235011 A1 Oct. 11, 2007

(51) Int. Cl.
*F02M 25/07* (2006.01)
*F02B 47/08* (2006.01)
*F02B 33/44* (2006.01)

(52) U.S. Cl. .................... 123/568.21; 60/605.2
(58) Field of Classification Search ...................
123/568.11–568.14, 568.19–568.21, 58.8,
123/316, 432; 60/605.2; 701/108
See application file for complete search history.

(56) References Cited

U.S. PATENT DOCUMENTS

| 4,109,625 A | * | 8/1978 | Kawamura et al. ..... 123/568.13 |
| 4,173,203 A | | 11/1979 | Nakajima et al. |
| 4,175,522 A | * | 11/1979 | Kawamura et al. ....... 123/568.2 |
| 4,276,865 A | * | 7/1981 | Hamai ..................... 123/568.2 |
| 4,856,473 A | | 8/1989 | Kawai et al. |
| 5,261,373 A | | 11/1993 | Ohsuga et al. |
| 6,102,014 A | | 8/2000 | Donaldson |
| 6,209,529 B1 | | 4/2001 | Everingham |
| 6,386,154 B1 | * | 5/2002 | Hellman et al. ............ 123/58.8 |
| 6,386,188 B1 | | 5/2002 | Bender |
| 6,688,293 B2 | * | 2/2004 | Urushihara et al. .... 123/568.13 |
| 6,758,195 B1 | | 7/2004 | Jaye |
| 6,769,393 B2 | * | 8/2004 | Widener et al. ............. 123/316 |

FOREIGN PATENT DOCUMENTS

| JP | 54077828 A | * | 6/1979 | ............ 123/568.13 |
| JP | 58053656 | | 3/1983 | |
| JP | 63183260 | | 7/1988 | |
| JP | 7103080 | | 4/1995 | |

OTHER PUBLICATIONS

US 6,095,122, 08/2000, Everingham (withdrawn)

* cited by examiner

*Primary Examiner*—Willis R Wolfe, Jr.
(74) *Attorney, Agent, or Firm*—Finnegan, Henderson, Farabow, Garrett & Dunner

(57) ABSTRACT

A method for recirculating exhaust gas includes operating an intake valve to open an intake port of a combustion chamber, operating an exhaust valve to open an exhaust port of the combustion chamber, and directing exhaust gas from the exhaust port to an exhaust recirculation port of the combustion chamber. The method also includes operating an exhaust recirculation valve to open the exhaust recirculation port to allow the exhaust gas to enter the combustion chamber and determining at least one valve actuation condition for controlling actuation of each of the intake valve and the exhaust recirculation valve.

27 Claims, 5 Drawing Sheets

EXHAUST GAS RECIRCULATION SYSTEM WITH IN-CYLINDER VALVE ACTUATION

TECHNICAL FIELD

The present disclosure relates generally to an exhaust gas recirculation system, and more particularly, to an exhaust gas recirculation system with in-cylinder valve actuation.

BACKGROUND

Engines, including diesel engines, gasoline engines, gaseous fuel-driven engines, and other engines known in the art, may exhaust a complex mixture of air pollutants. The air pollutants may be composed of gaseous and solid material, including particulate matter, nitrogen oxides (NOx), and sulfur compounds.

Due to heightened environmental concerns, exhaust emission standards have become increasingly stringent over the years. The amount of pollutants emitted from an engine may be regulated depending on the type, size, and/or class of engine.

One method that has been implemented by engine manufacturers to comply with the regulation of engine emissions is exhaust gas recirculation ("EGR"). Conventional EGR systems recirculate engine exhaust gas into the intake air supply of the engine. The exhaust gas directed to a combustion chamber in the engine reduces the concentration of oxygen within the combustion chamber and increases the specific heat of the air/fuel mixture, thereby lowering the maximum combustion temperature within the combustion chamber. The lowered maximum combustion temperature and reduced oxygen concentration can slow the chemical reactions forming NOx.

An EGR system for a spark-ignited engine is described in U.S. Pat. No. 6,758,195 ("the '195 patent") to Jaye. The '195 patent describes an EGR system including an engine with a combustion chamber having a pair of intake ports, an exhaust port, and an EGR port. A pair of intake valves and an exhaust valve are actuated using a camshaft to allow flow through the respective intake and exhaust ports, and an EGR valve is separately actuated to allow flow through the EGR port. The EGR port is fluidly connected to the exhaust port to allow recirculated exhaust gas to flow to the combustion chamber.

Although the system of the '195 patent provides an EGR system, the EGR system is incorporated into a spark-ignited engine in which the timing patterns for the intake and exhaust valves are predetermined using a camshaft, and the EGR valve is opened after the intake valve is opened. This is sufficient for spark-ignited engines in which the intake air is typically at a lower pressure than the recirculated exhaust gas. Intake air having a lower pressure is supplied first to the combustion chamber, and then recirculated exhaust gas having a higher pressure is supplied. However, when the recirculated exhaust gas has a lower pressure than the intake air and the intake air is supplied to the combustion chamber first, the higher pressure intake air may attempt to flow out of the combustion cylinder through the EGR port after the EGR valve is opened. As a result, there may be a backflow of intake air through the EGR port, and this backflow reduces the efficiency of the EGR system, thereby reducing the ability of the EGR system to reduce exhaust emissions effectively. Alternatively, there may be no flow of recirculated exhaust gas into the combustion chamber so that the efficiency of the EGR system would be less than zero and not just low. Furthermore, in the EGR system of the '195 patent, the recirculated exhaust gas flows directly from the exhaust port to the EGR port. Therefore, the EGR system of the '195 patent does not allow for treatment of the recirculated exhaust gas before the recirculated exhaust gas is supplied to the EGR port.

The disclosed system is directed to overcoming one or more of the problems set forth above.

SUMMARY OF THE INVENTION

In one aspect, the present disclosure is directed to a method for recirculating exhaust gas. The method includes operating an intake valve to open an intake port of a combustion chamber, operating an exhaust valve to open an exhaust port of the combustion chamber, and directing exhaust gas from the exhaust port to an exhaust recirculation port of the combustion chamber. The method also includes operating an exhaust recirculation valve to open the exhaust recirculation port to allow the exhaust gas to enter the combustion chamber and determining at least one valve actuation condition for controlling actuation of each of the intake valve and the exhaust recirculation valve.

In another aspect, the present disclosure is directed to an exhaust recirculation system having a power source including at least one combustion chamber. The at least one combustion chamber includes an intake port, an exhaust port, and an exhaust recirculation port. The exhaust recirculation system also includes an intake valve configured to open the intake port and an exhaust valve configured to open the exhaust port to output exhaust gas from the at least one combustion chamber. An energy extraction device is configured to receive the exhaust gas, extract energy from the exhaust gas, and direct the exhaust gas to the exhaust recirculation port. An exhaust recirculation valve is configured to open the exhaust recirculation port to receive the exhaust gas from the energy extraction device.

In yet another aspect, the present disclosure is directed to another method for recirculating exhaust gas. The method includes operating an intake valve to open an intake port of a combustion chamber during an intake stroke, operating an exhaust valve to open an exhaust port of the combustion chamber to output exhaust gas from the combustion chamber, and directing the exhaust gas from the exhaust port to an exhaust recirculation port of the combustion chamber. The method also includes operating an exhaust recirculation valve to open the exhaust recirculation port during the intake stroke. One of the intake and exhaust recirculation valves is a first actuated valve, and the other of the intake and exhaust recirculation valves is a second actuated valve. The second actuated valve begins to open the port associated with the second actuated valve after the first actuated valve begins closing the port associated with the first actuated valve.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
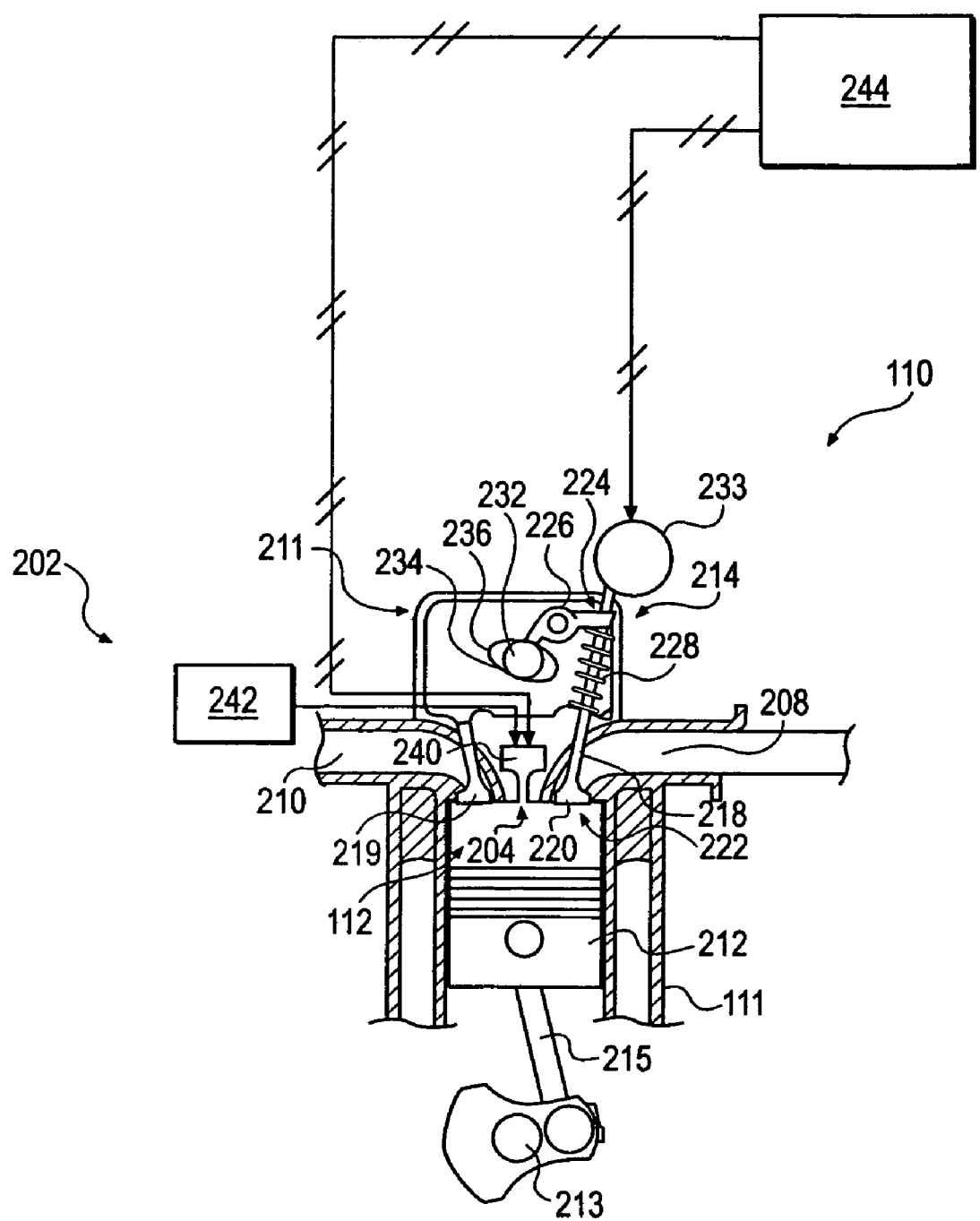
FIG. 1 is a combination diagrammatic and schematic illustration of an exemplary combustion chamber of an internal combustion engine and a valve actuator.

Referring to FIG. 1, a power source, such as an engine 110, is provided. The engine 110 may be, for example, a four-stroke, internal combustion diesel engine, and it is to be understood that the teachings of the disclosure can be employed in conjunction with any other type of engine, for example, a spark ignited gasoline or other compression ignited engine.

The engine 110 includes an engine block 111 defining at least one combustion chamber 112, one of which is shown in FIG. 1. The number of the combustion chambers 112 in the engine 110 depends upon the particular application. For example, in the exemplary embodiments shown in FIGS. 2 and 3, the engine 110 includes six combustion chambers 112. The engine 110 may include a piston 212 in aligned fashion with and slidably movable in each of the combustion chambers 112. The pistons 212 are positioned sequentially in the engine block 111, e.g., in an in-line or V configuration.

A crankshaft 213 may be rotatably disposed within the engine block 111 and supported by bearings (not shown). As known in the art, the engine 110 may be connected to a conventional start system, e.g., a battery and a starter motor that is operatively connected to the crankshaft 213. A connecting rod 215 may couple each of the pistons 212 to the crankshaft 213 so that sliding motion of the piston 212 within the combustion chamber 112 results in rotation of the crankshaft 213. Similarly, rotation of the crankshaft 213 results in a sliding motion of the piston 212. As will be referenced below, an uppermost position of the piston 212 in the combustion chamber 112 corresponds to a top dead center ("TDC") position of the piston 212, and a lowermost position of the piston 212 in the combustion chamber 112 corresponds to a bottom dead center ("BDC") position of the piston 212. The connecting rod 215 connects to each of the pistons 212 and to the crankshaft 213 so as to capitalize on the motion of the piston 212 to produce useful work in a machine (not shown) with which the engine 110 is associated.

Figure 4:
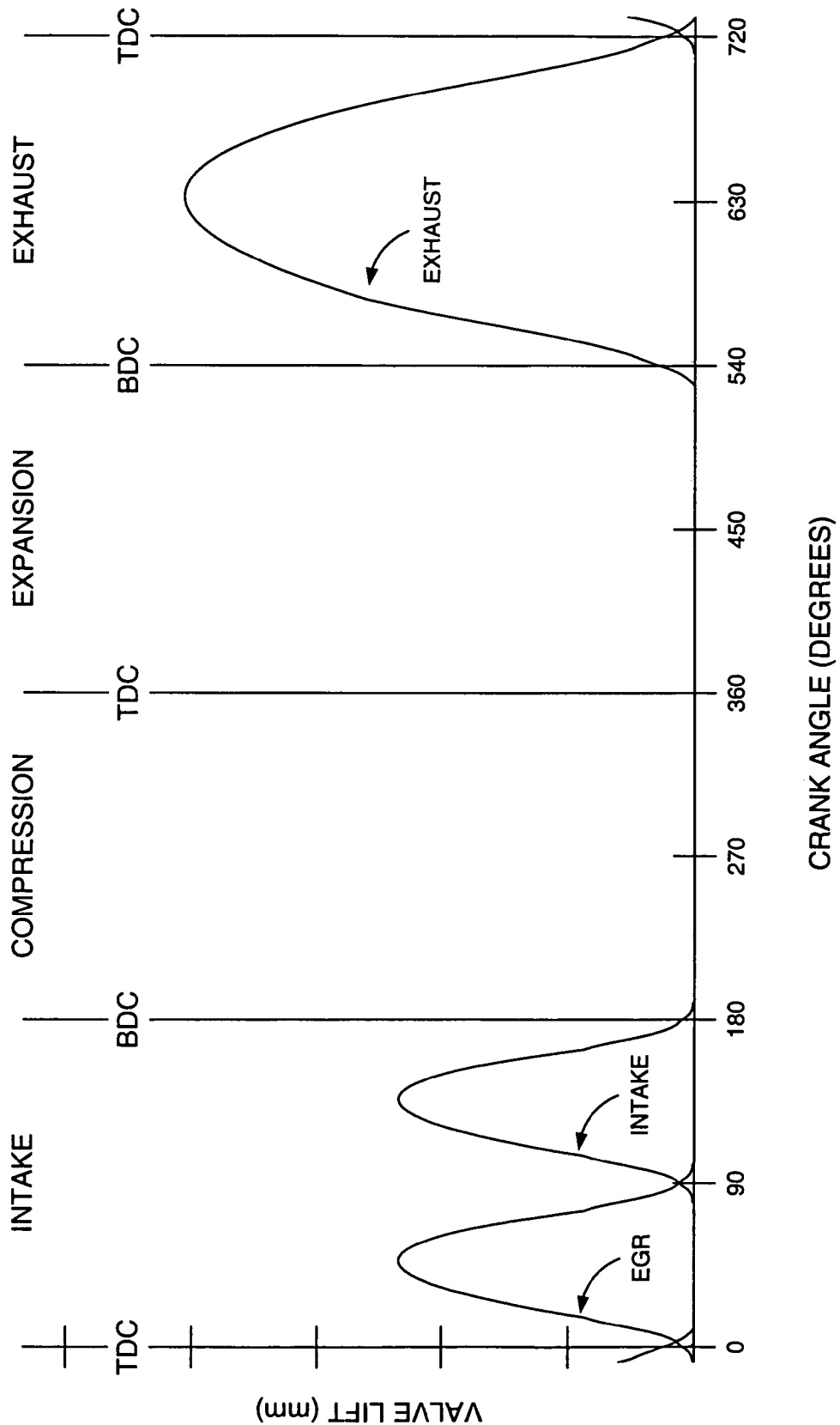
FIG. 4 is a graphic illustration of valve lifts of the exhaust valve, intake valve, and exhaust gas recirculation valve in accordance with an exemplary embodiment.

As one skilled in the art will recognize, in a four-stroke engine cycle, the piston 212 reciprocates in the combustion chamber 112 from the uppermost position to the lowermost position (or from the lowermost position to the uppermost position) during each of the four strokes. In particular, the piston 212 reciprocates from the TDC position to the BDC position during a first stroke (intake stroke), from the BDC position to the TDC position during a second stroke (compression stroke), from the TDC position to the BDC position during a third stroke (expansion stroke), and from the BDC position to the TDC position during a fourth stroke (exhaust stroke). Then, the four-stroke cycle begins again. Each piston stroke correlates to about 180° of crankshaft rotation, or crank angle. As shown in FIG. 4, when the intake stroke begins at a reference crank angle, such as 0°, the compression stroke begins at about 180°, the expansion stroke at about 360°, and the exhaust stroke at about 540°. When there is more than one combustion chamber 112, then there may be a phase difference between the pistons 212 of each of the combustion chambers 112.

Figure 2:
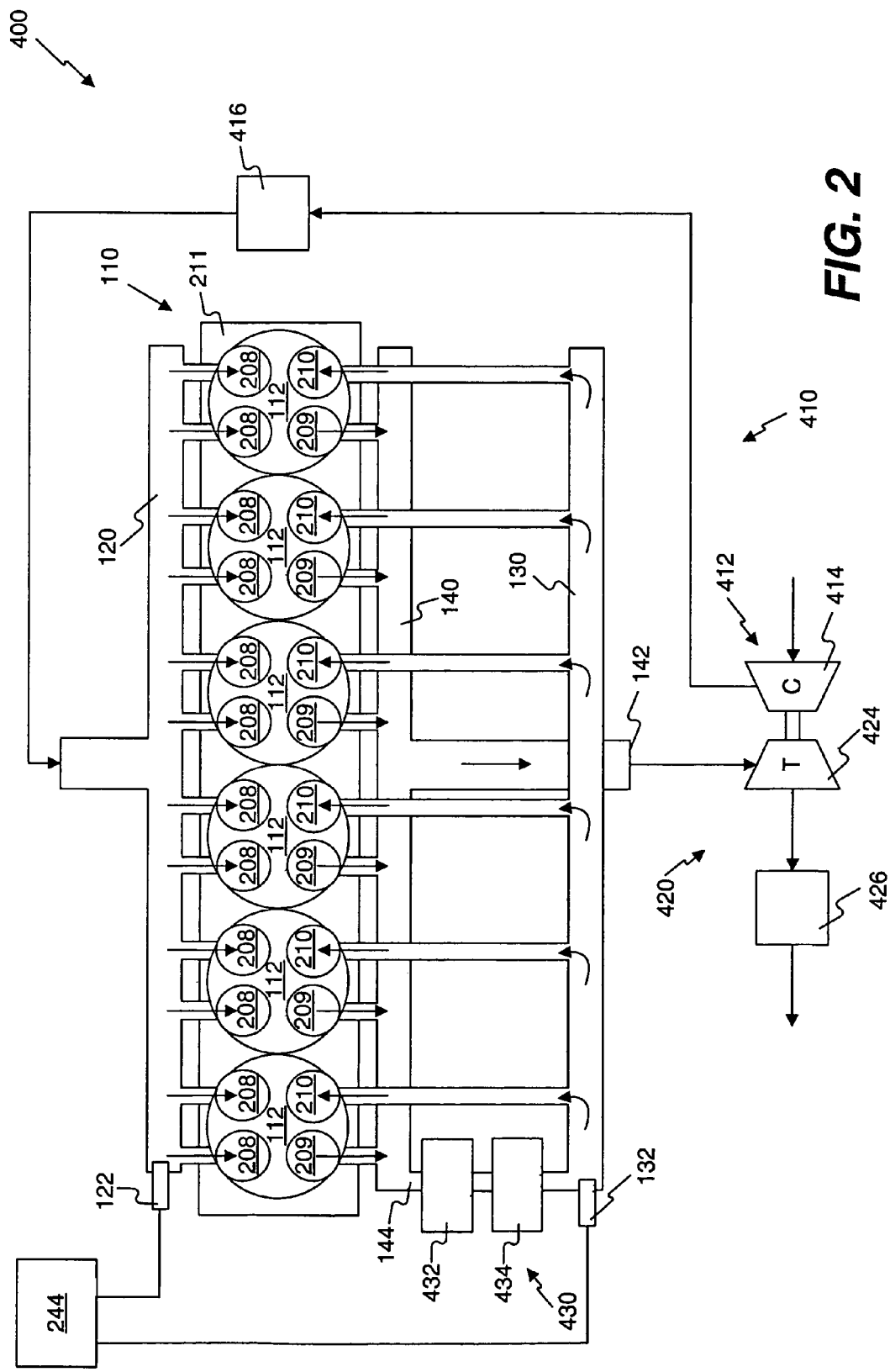
FIG. 2 is a diagrammatic representation of an exhaust gas recirculation system in accordance with an exemplary embodiment.
Figure 3:
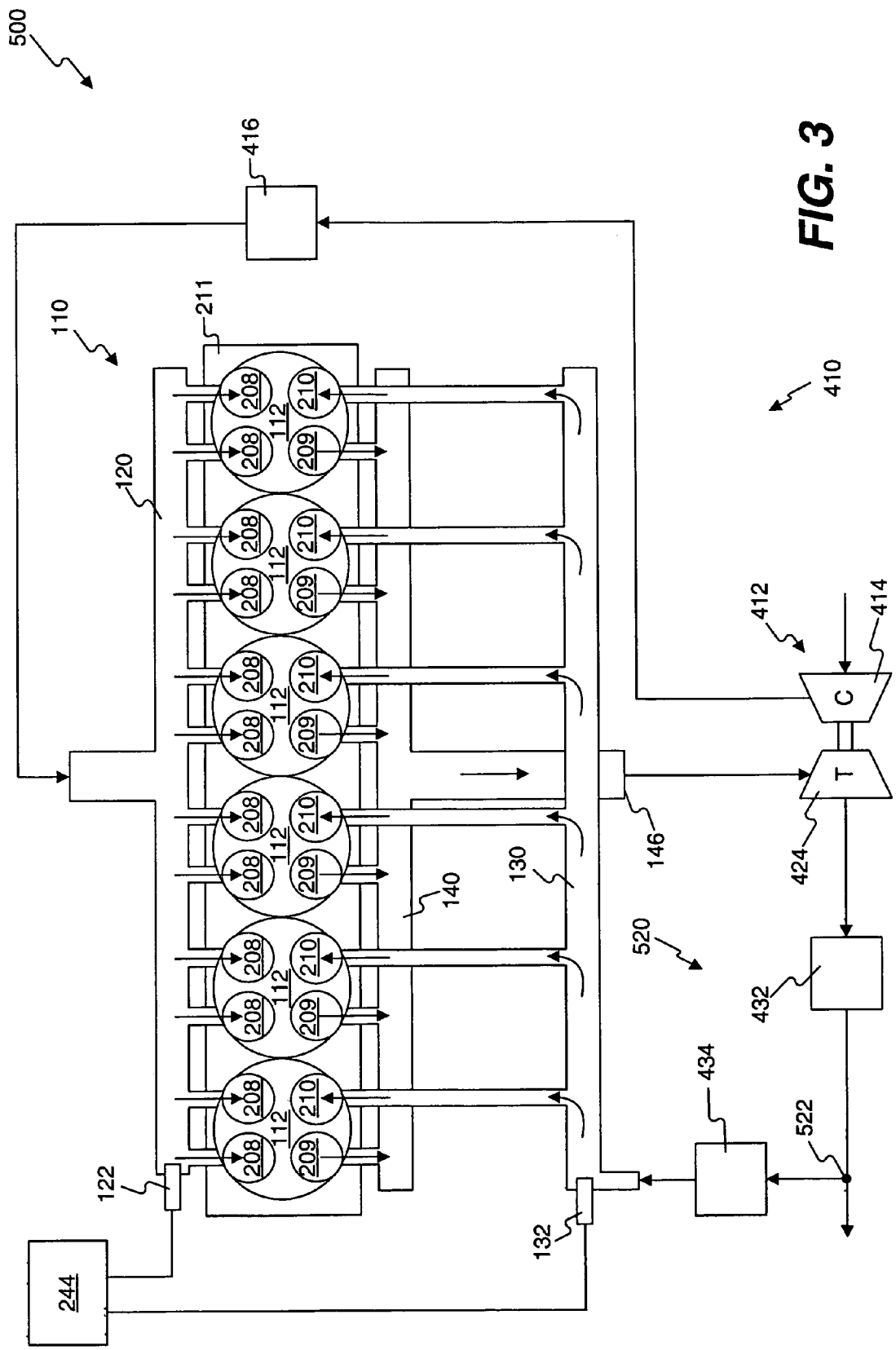
FIG. 3 is a diagrammatic representation of an exhaust gas recirculation system in accordance with another exemplary embodiment.

Each of the combustion chambers 112 may be defined by the engine block 111, the piston 212, and a cylinder head 211. As shown in FIGS. 2 and 3, the exemplary cylinder head 211 includes a pair of intake ports 208, an exhaust port 209, and an EGR port 210 to allow for fluid communication into and out of the combustion chamber 112. One of the intake ports 208 and the EGR port 210 are shown in detail in FIG. 1. Air may enter the combustion chamber 112 through the intake ports 208 and recirculated exhaust gas may enter the combustion chamber 112 through the EGR port 210 while combustion or exhaust gases may exit the combustion chamber 112 through the exhaust port 209. It is to be understood that, alternatively, the cylinder head 211 may include one or more of each type of port.

Each intake port 208, exhaust port 209, and EGR port 210 opens to the combustion chamber 112. As shown in FIG. 1, the intake port 208 may be opened and closed by an intake valve 218 of an intake valve assembly 214, and the EGR port 210 may be opened and closed by an EGR valve 219 of an EGR valve assembly (not shown). Although it is not illustrated, the exhaust port 209 may also be opened and closed by an exhaust valve of an exhaust valve assembly, and the exhaust valve and exhaust valve assembly may function in a similar manner as the intake and/or EGR valves 218, 219 and the intake valve assembly 214 and/or EGR valve assembly.

As shown in FIG. 1, the intake valve 218 may include, for example, a valve head 220 at a first end 222, with the valve head 220 being sized and arranged to selectively close the intake port 208. A second end 224 of the intake valve 218 may be connected to a rocker arm 226 or any other valve-actuating mechanism. The intake valve 218 may be movable between a first position permitting flow through the intake port 208 to enter the combustion chamber 112 and a second position substantially blocking flow through the intake port 208 to the combustion chamber 112. In the exemplary embodiments, a valve spring 228 imparts a force that biases the corresponding valve head 220 into sealing engagement with the valve port 208 to bring the intake valve 218 to the second, closed position. It is to be understood, however, that the intake valve 218 may be movable between the first and second positions using other mechanisms known in the art and is not limited to mechanisms including a valve spring.

The intake valve assembly 214 may be operated hydraulically, pneumatically, electronically, or by any combination of mechanics, hydraulics, pneumatics, and/or electronics. In the exemplary embodiment shown in FIG. 1, a valve actuator 233 is provided to open and close the intake valve 218. The valve actuator 233 is operated hydraulically, pneumatically, electronically, mechanically, or any combination thereof and may be provided to hold open the valves 218, 219 for longer periods or for timing sequences other than that dictated by a cam.

For example, the valve actuator 233 may hydraulically lift the intake valve 218 from its seat, i.e., open the intake valve 218, and hold the intake valve 218 open for a desired period. The valve actuator 233 may be selectively operated to supply hydraulic fluid, for example, pressurized fluid, to resist the closing of the intake valve 218 by the bias of the spring 228. The valve actuator 233 may then be hydraulically locked for a desired period depending on the desired performance of the engine 110. Then, the pressurized hydraulic fluid may be drained/released from the valve actuator 233 to allow the intake valve 218 to close.

Alternatively (or in addition), a camshaft 232 carrying a cam 234 with one or more lobes 236 may be arranged to operate the intake valve assembly 214 cyclically based on the configuration of the cam 234, the lobes 236, and the rotation of the camshaft 232.

The EGR valve 219 and the exhaust valve may be operated using like components in a similar manner to the intake valve 218. For example, it is understood that separate valve actuators 233 and/or cams 234 may also be provided to open and close the exhaust valve and the EGR valve 219. Furthermore, one or more similar valves, e.g., the pair of intake valves 218, may be actuated in unison using a single valve actuator 233 and/or cam 234.

Referring to FIG. 2, the cylinder head 211 is connected to an intake manifold 120, an EGR manifold 130, and an exhaust manifold 140. The intake manifold 120 provides fluid, e.g., air, to the combustion chambers 112 via the intake ports 208 in the cylinder head 211. The EGR manifold 130 provides recirculated fluid, e.g., recirculated exhaust gas, to the combustion chambers 112 via the EGR ports 210 in the cylinder head 211. The exhaust manifold 140 receives exhaust fluid, e.g., exhaust gas, from the combustion chambers 112 via the exhaust ports 209 in the cylinder head 211. The intake manifold 120, the EGR manifold 130, and the exhaust manifold 140 may be constructed as single-part or multi-part manifolds, depending upon the particular application.

Referring back to FIG. 1, each combustion chamber 112 is provided with a fuel supply system 202. The fuel supply system 202 may include a fuel port 204 opening to the combustion chamber 112 and may inject fuel, e.g., diesel fuel, directly into the combustion chamber 112. The fuel supply system 202 may include a fuel injector assembly 240, e.g., a mechanically-actuated, electronically-controlled unit injector, in fluid communication with a common fuel rail 242. The common fuel rail 242 provides fuel to the fuel injector assembly 240 associated with each combustion chamber 112. The fuel injector assembly 240 may inject or otherwise spray fuel into the combustion chamber 112 via the fuel port 204 in accordance with a desired timing. Alternatively, the fuel injector assembly 240 may be actuated and/or operated hydraulically, mechanically, electrically, piezoelectrically, or any combination thereof.

As shown in FIG. 2, a controller 244, such as a control module or processor, may be provided, and the functions of the controller 244 may be performed by a single controller or by a plurality of controllers. The controller 244 may be electrically connected to each of the valve actuators 233 and/or fuel injector assemblies 240 so that the valve actuators 233 and/or fuel injector assemblies 240 may be actuated upon receipt of a control signal or the like from the controller 244.

The controller 244 may receive information from one or more sensors operatively connected with the engine 110. Each of the sensors may be configured to sense an operating parameter of the engine 110. For example, an intake manifold pressure sensor 122 may be disposed in the intake manifold 120 to provide an indication of a pressure of the intake air supplied to the combustion chamber 112, and an EGR manifold pressure sensor 132 may be disposed in the EGR manifold 130 to provide an indication of a pressure of the recirculated exhaust gas supplied to the combustion chamber 112. Furthermore, a mass flow sensor (not shown) may be disposed in each of the intake and EGR manifolds 120, 130.

The exhaust recirculation system 400 illustrated in FIG. 2 includes an air induction system 410 that receives fresh air from, e.g., an air cleaner (not shown), and supplies air into the combustion chambers 112 of the engine 110. The exemplary air induction system shown in FIG. 2 includes a compressor 414 and a cooler 416 for supplying cooled and compressed air to the combustion chambers 112. The compressor 414 and cooler 416 are disposed in a series relationship and are fluidly connected to each other and to the inlet of the intake manifold 120 via fluid passageways.

The compressor 414 may be configured to pressurize the atmospheric air received by the air induction system to a predetermined pressure level. The compressor 414 may be a fixed geometry compressor, a variable geometry compressor, or any other type of compressor known in the art. The cooler 416 may be, for example, an air-to-air heat exchanger or an air-to-liquid heat exchanger, and may be configured to facilitate the transfer of heat to or from the air directed into the engine 110. It is contemplated that additional components can be included in the air induction system 410 such as, e.g., additional compressors, additional coolers, one or more valves, one or more air cleaners, one or more waste gates, a control system, and other configurations for introducing air into the combustion chambers 112 of the engine 110. Alternatively, the compressor 414 and/or the cooler 416 may be omitted from the exhaust recirculation system 400.

The exhaust recirculation system 400 also includes a first exhaust system 420 and a second exhaust system 430. The first exhaust system 420 directs exhaust gas from a first outlet 142 of the exhaust manifold 140 out from the engine 110, and the second exhaust system 430 recirculates the exhaust gas from a second outlet 144 of the exhaust manifold 140 and directs the recirculated exhaust gas to the EGR manifold 130.

A valve (not shown) may be fluidly connected to, and downstream from, the first outlet 142 of the exhaust manifold 140. The valve may be used to control the respective amounts of exhaust gas flowing through the first exhaust system 420 and the second exhaust system 430. The valve may be actuated or otherwise controlled by, for example, a solenoid or other actuation device known in the art (not shown) capable of receiving signals from the controller 244. Alternatively, the valve may be fluidly connected to, and downstream from, the second outlet 144 of the exhaust manifold 140.

The exemplary first exhaust system 420 shown in FIG. 2 includes an energy extraction device, such as a turbine 424, and an aftertreatment device 426. The turbine 424 is fluidly connected to, and downstream from, the first outlet 142 of the exhaust manifold 140. The compressor 414 and the turbine 424 may be coupled to form a turbocharger 412. As the hot exhaust gases exiting the engine 110 expand against blades (not shown) of the turbine 424, the turbine 424 rotates and drives the connected compressor 414. Alternatively, the turbine 424 may be omitted and the compressor 414 may be driven by the engine 110 mechanically, hydraulically, electrically, or in any other manner known in the art.

The aftertreatment device 426 is fluidly connected to, and downstream from, the turbine 424. Alternatively, the aftertreatment device 426 may be positioned upstream from the turbine 424. The aftertreatment device 426 is configured to remove particulates and other pollutants from the exhaust flow. The aftertreatment device 426 of the exemplary embodiment may include a filter for capturing particulates, ash, or other materials from the exhaust gas to prevent their discharge from the aftertreatment device 426 into the surrounding environment, such as a diesel particulate filter (DPF), a catalyst for reducing an ignition temperature of the particulate matter trapped by the filter, a system for regenerating the filter by removing the particulate matter trapped by the filter, a catalyst for removing pollutants such as NOx from the exhaust gas by chemical reaction, and/or another exhaust gas treatment device. The filter that removes particulates from the exhaust gas outputs so-called "clean" exhaust gas, e.g., exhaust gas with a reduced amount of particulates. It is contemplated that additional components can be included in the first exhaust system 420, such as, e.g., additional turbines for turbochargers and/or for producing power, and other aftertreatment components. Alternatively, the turbine 424 and/or the aftertreatment device 426 may be omitted.

The exemplary second exhaust system 430 shown in FIG. 2 includes a filter 432 and a cooler 434. The filter 432 and the cooler 434 are disposed in a series relationship and are fluidly connected to the second outlet 144 of the exhaust manifold 140 and the inlet of the EGR manifold 130. The filter 432 may be a filter as described above in connection with the aftertreatment device 426. The cooler 434 may be configured to facilitate the transfer of heat, such as the cooler 416 described above, to or from the recirculated exhaust gas directed into the engine 110. The cooler 434 is fluidly connected to, and upstream from, the inlet of the EGR manifold 130. Alternatively, the filter 432 and/or the cooler 434 may be omitted from the exhaust recirculation system 400.

FIG. 3 illustrates another exemplary exhaust recirculation system. The exhaust recirculation system 500 includes the air induction system 410, which is described above and shown in FIG. 2. However, instead of providing two separate exhaust systems 420 receiving separate portions of the exhaust gas, the exhaust recirculation system 500 includes a single exhaust system 520 which receives the entire flow of exhaust gas via a single outlet 146 of the exhaust manifold 140. The exhaust system 520 outputs a portion of the exhaust gas to the surrounding atmosphere and directs the rest of the exhaust gas to the EGR manifold 130. The exhaust system 520 of the exemplary exhaust recirculation system 500 includes the turbine 424, which is described above in connection with the exhaust recirculation system 400 shown in FIG. 2.

The filter 432 as described above is fluidly connected to, and downstream from, the turbine 424, and outputs clean exhaust gas. Alternatively, or in addition, the exhaust system 520 may include another type of aftertreatment device as described above, or the filter 432 may be omitted.

A port 522 is fluidly connected to, and downstream from, the filter 432. The port 522 is configured to allow at least a portion of the flow of clean exhaust gas from the filter 432 to the EGR manifold 130 to recirculate back to the engine 110. The remaining clean exhaust gas that is not recirculated is output from the exhaust recirculation system 500. A valve (not shown) may be provided to control the amount of exhaust gas flowing through the port 522. The valve may be actuated or otherwise controlled by the controller 244.

The cooler 434 as described above is fluidly connected to, and downstream from, the port 522, and is configured to facilitate the transfer of heat to or from the recirculated exhaust gas. The cooler 434 is fluidly connected to, and upstream from, the inlet of the EGR manifold 130. Alternatively, the cooler 434 may be omitted from the exhaust recirculation system 500.

INDUSTRIAL APPLICABILITY

The disclosed exhaust recirculation system may be applicable to any powered system that includes a power source that produces exhaust, such as an engine. The disclosed exhaust recirculation system may include separate intake ports and EGR ports to supply intake air and recirculated exhaust gas separately to the engine combustion chamber. The disclosed system allows for controlling the relative amounts of intake air and recirculated exhaust gas supplied to the combustion chamber and for actuating the intake and EGR valves separately depending on the pressures in the intake or EGR manifolds.

The engine 110 can be used in a variety of applications. For example, the engine 110 may be provided in a prime-mover, vehicle, or the like, or any type of machine requiring mechanical or electrical energy. Such machines may include, but are not limited to, earth moving machines, backhoes, graders, rock crushers, pavers, skid-steer loaders, cranes, automobiles, trucks, stationary machines, marine machines, industrial machines, and the like.

Figure 5:
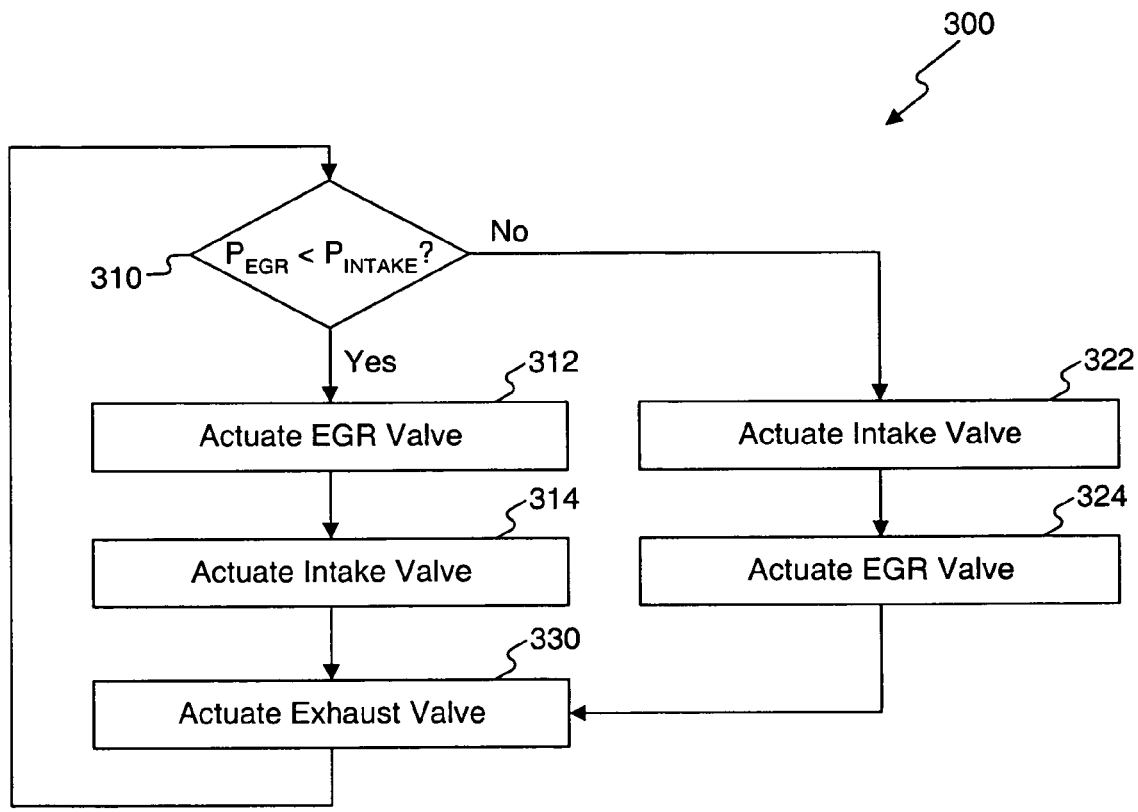
FIG. 5 is a flow chart illustrating an exemplary method of controlling the operation of an internal combustion engine in accordance with an exemplary embodiment.

The operation of the engine 110 shown in FIGS. 1-3 and specifically, the actuation timing of the intake and EGR valves 218, 219, will now be explained with reference to FIGS. 4 and 5. As described above, the piston 212 reciprocates between the TDC position and the BDC position during the intake stroke, the compression stroke, the expansion stroke, and the exhaust stroke. FIG. 4 shows an exemplary graph indicating the relationship between an exhaust valve actuation, an EGR valve actuation, an intake valve actuation, and the crankshaft crank angle during these four strokes. FIG. 5 is a flow chart showing a sequence of steps 300 for actuating the valves. The sequence of steps 300 repeats as the piston 212 reciprocates in the combustion chamber 112 during the four strokes.

In the intake stroke, the pistons 212 descend through the combustion chambers 112 away from the combustion chamber head 211. The exhaust valves are in a closed position to block any flow through the exhaust ports 209. The intake and EGR valves 218, 219 open the respective intake and EGR ports 208, 210 substantially during the intake stroke. The intake valves 218 and EGR valves 219 are separately actuated to direct air and recirculated exhaust gas into the combustion chambers 112 in a controlled manner as described below.

The intake manifold pressure sensor 122 measures a pressure (Pintake) of the air in the intake manifold 120, and the EGR manifold pressure sensor 132 measures a pressure (Pegr) of the recirculated exhaust gas in the EGR manifold 130. The controller 244 compares the two pressure measurements, Pintake and Pegr, as indicated in step 310 of FIG. 5.

If the pressure in the EGR manifold 130 is less than the pressure in the intake manifold 120 (Pegr<Pintake), then the EGR valve 219 opens before the intake valve 218, thereby allowing recirculated exhaust gas to enter the combustion chamber 112 before the intake air. Therefore, the valves 218, 219 connected to the manifold 120, 130 having lower pressure fluid open first.

FIG. 4 shows a timing pattern in which the EGR valve actuation occurs before the intake valve actuation, i.e., when Pegr<Pintake. The EGR valves 219 are opened, as indicated in step 312, and in so doing, recirculated exhaust gas supplied via the EGR ports 210 is drawn into the combustion chambers 112. The controller 244 may monitor the amount of recirculated exhaust gas entering the combustion chamber 112 through the EGR ports 210, e.g., by monitoring the valve actuation period, the pressure measurement, and/or other variables, to determine when to close the EGR valves 219. When the EGR valves 219 are closing, the intake valves 218 begin to open, as indicated in step 314 of FIG. 5. In so doing, intake air supplied via the intake ports 208 is drawn into the combustion chambers 112. Then, the controller 244 may monitor the amount of air entering the combustion chamber 112 through the intake ports 208, e.g., by monitoring the valve actuation period, the pressure measurement, and/or other variables, to determine when to close the intake valves 218.

If, in step 310, the pressure in the EGR manifold 130 is greater than or equal to the pressure in the intake manifold 120 (Pegr≧Pintake), then the intake valve 218 opens before the EGR valve 219. As a result, intake air is drawn into the combustion chamber 112 before the recirculated exhaust gas. The intake valves 218 are opened, as indicated in step 322, and in so doing, intake air supplied via the intake ports 208 is drawn into the combustion chambers 112. The controller 244 may monitor the amount of air entering the combustion chamber 112 through the intake ports 208, as described above, to determine when to close the intake valves 218. When the intake valves 218 are closing, the EGR valves 219 are opened, as indicated in step 324. In so doing, recirculated exhaust gas supplied via the EGR ports 210 is drawn into the combustion chambers 112. Then, the controller 244 may monitor the amount of recirculated exhaust gas entering the combustion chamber 112 through the EGR ports 210, as described above, to determine when to close the EGR valves 219. Alternatively, mass flow sensors (not shown) in each of the intake and EGR manifolds 120, 130 may be used to monitor the mass flow of recirculated exhaust gas and intake air.

In the embodiment described above, the controller 244 controls the actuation, e.g., by determining the valve actuation order, the valve actuation periods, valve actuation start times, and/or other valve actuation conditions, of the intake valves 218 and the EGR valves 219 separately. Thus, the cams 234 for the intake and EGR valves 218, 219 may be omitted, and the actuation of the intake and EGR valves 218, 219 may be entirely facilitated by the valve actuators 233.

Regardless of whether the intake valves 218 or the EGR valves 219 open first, there may be situations when there is no substantial overlap between the valve actuation periods of the intake valves 218 and the EGR valves 219, as shown in FIG. 4. In these situations, there may be some overlap when the second actuated valve (the intake valve 218 in the exemplary valve lifts shown in FIG. 4) begins to open. However, the overlap occurs when the first actuated valve (the EGR valve 219 in the exemplary valve lifts shown in FIG. 4) is substantially closed, and when the first actuated valve is closing and the second actuated valve is opening. The second actuated valve begins opening after the first actuated valve begins closing or after the first actuated valve is substantially closed.

The actuation order determining process, as shown in FIG. 5, may occur during each engine cycle or after a predetermined period of time or predetermined number of engine cycles. Alternatively, the actuation order determining process may occur after a predetermined change in pressure occurs in one or both of the intake and EGR manifolds 120, 130. In another alternative, the controller 244 may monitor the pressure measurements Pintake and Pegr and may initiate the actuation order determining process when there is a change from Pegr≧Pintake to Pegr<Pintake or vice versa.

In the exemplary timing pattern shown in FIG. 4, the first actuated valve closes at approximately around 90° crank angle in the intake stroke, the second actuated valve opens at approximately around 90° crank angle in the intake stroke, and the second actuated valve closes at approximately 180° crank angle (TDC) of the intake stroke. However, the closing timing of the first actuated valve and the opening and closing timing of the second actuated valve may vary based on a determination by the controller 244. For example, the controller 244 may control the valves so that the first actuated valve may close at approximately 50° crank angle, the second actuated valve may open at approximately 50° crank angle, and the second actuated valve may close at approximately 90° crank angle in the intake stroke.

The valve actuation period may depend on several factors. Therefore, the controller 244 may be programmed to take into account multiple variables when determining how long to open the intake valves 218 and EGR valves 219, i.e., when determining how much intake air and recirculated exhaust gas to draw into the combustion chamber 112. This determination by the controller 244 is carried out based on one or more factors, e.g., one or more operating conditions, such as engine speed, load on the engine 110, a measured level of NOx and/or other pollutants in the exhaust gas, and/or the pressure measurements Pintake and Pegr, and/or one or more target conditions, such as a target engine speed and a target level of NOx and/or other pollutant. Tests may be carried out to determine exhaust emissions and engine performance when varying the amounts of intake air and recirculated exhaust gas in the combustion chamber 112 and at different operating conditions of the engine 110. The results of these tests may be used to preprogram the controller 244 to determine when and for how long to open the intake valves 218 and the EGR valves 219 under different engine operating conditions and for different exhaust emission regulations, e.g., by using a map or a lookup table. Furthermore, the desired amounts of recirculated exhaust gas and intake air may change. The controller 244 may continuously, or at predetermined time intervals or events, monitor these various operating conditions to ensure that proper amounts of recirculated exhaust gas and intake air are drawn into the combustion chamber 112. The controller 244 may continuously determine and/or adjust the valve actuation period of the intake and EGR valves 218, 219, e.g., at step 310 of the actuation order determining process before actuating the valves 218, 219, or the controller 244 may determine and/or adjust the valve actuation period after predetermined time intervals or events during engine operation.

As a result, a proper balance between the amount of intake air and recirculated exhaust gas drawn into the combustion chamber 112 can be achieved. Performing combustion using recirculated exhaust gas decreases NOx emissions, but as a result, the engine 110 typically creates more smoke. Also, when there is too much recirculated exhaust gas and not enough intake air, the engine 110 may produce less power since there is less oxygen in recirculated exhaust gas. Therefore, the controller 244 may regulate the amounts of recirculated exhaust gas and intake air drawn into the combustion chamber 112 to maintain this balance.

The maximum lift positions of the intake and EGR valves 218, 219 are lower than the maximum lift position of the exhaust valves, as shown in FIG. 4, because the intake and EGR valves 218, 219 are open for shorter periods of time. However, it is understood that the maximum lift positions for all of the valves may be equal or may be at varying levels with respect to each other.

In the compression stroke, the piston 212 reverses its motion at the direction of the connecting rod 215. The intake valves 218, the EGR valve 219, and the exhaust valve are closed as the piston 212 ascends to its TDC position, and the air in the combustion chamber 112 is compressed.

Fuel is injected into the combustion chamber 112 using the fuel injector assembly 240 during the compression and/or expansion strokes. Combustion of the fuel is initiated by compression ignition of the air/fuel mixture during the compression and/or expansion strokes. The resulting explosion and expanding gases push the pistons 212 again in a descending direction in the combustion chambers 112, while the intake valves 218, the EGR valves 219, and the exhaust valves remain closed.

In the exhaust stroke, the pistons 212 ascend in the combustion chambers 112, but with the exhaust valves open, as indicated in step 330, thereby pushing the exhaust gases out of the combustion chambers 112 via the exhaust ports 209. Then, the exhaust valve 219 is closed. The exhaust valve opens the exhaust port 209 substantially during the exhaust stroke. However, during substantially the entire exhaust stroke, the intake valves 218 and EGR valves 219 remain closed. Since the exhaust valve is connected to a separate valve actuator 233 and/or cam 234, the valve actuation conditions for the exhaust valves may be different than the valve actuation conditions of the intake valves 218 and the EGR valves 219. For example, the lift of the exhaust valve 219, as shown in FIG. 4, may be similar to the lift of an exhaust valve in a conventional Otto or diesel cycle, as is known in the art. Thus, the valve actuators 233 for the exhaust valves may be omitted, and the actuation of the exhaust valves may be entirely facilitated by the cams 234.

Alternatively, the engine 110 may be operated cyclically to open the EGR valves 219 before the intake valves 218, as shown in FIG. 4, without requiring a determination from the controller 244 regarding the valve actuation conditions. As a result, steps 310, 322, and 324 may be omitted. This modification is especially advantageous for applications for which the pressure in the EGR manifold 130 is more often lower than the pressure in the intake manifold 120. Thus, the opening and closing of the intake and EGR valves 218, 219 may be fixed events during the engine cycle. Thus, the valve actuators 233 for the intake and EGR valves 218, 219 may be omitted, and the actuation of the intake and EGR valves 218, 219 may be entirely facilitated using the cams 234.

As another alternative, the engine 110 may be operated cyclically to open the intake valves 218 before the EGR valves 219 so that steps 310, 312, and 314 may be omitted. Again, the controller 244 does not determine any valve actuation conditions. This modification is especially advantageous for applications for which the pressure in the intake manifold 120 is more often lower than the pressure in the EGR manifold 130. The opening and closing of the intake and EGR valves 218, 219 may be fixed events during the engine cycle. Thus, the valve actuators 233 for the intake and EGR valves 218, 219 may be omitted, and the actuation of the intake and EGR valves 218, 219 may be entirely facilitated using the cams 234.

The operation of the exhaust recirculation system 400, which includes the engine 110 operating as described above, will now be explained with reference to FIG. 2. The compressor 414 of the turbocharger 412 receives fresh air and is driven by the exhaust gas propelled turbine 424 to pressurize the air. The compressor 414 sends the compressed air to the cooler 416, which cools the compressed air. Cooling the compressed intake air may lower combustion temperatures, thereby reducing thermal stress on the engine 110 and the intake manifold 120. Furthermore, the density of the intake air may increase, thereby increasing the power output by the engine 110. As a result, smoke and other emissions may be reduced. Furthermore, cooling the compressed intake air also improves the fuel economy of the engine 110 by reducing the work associated with getting a fixed mass of air into the combustion chamber 112. Then, the cooled and compressed air flows to the inlet of the intake manifold 120. The air is supplied to each of the combustion chambers 112 via the intake manifold 120 and the intake ports 208.

The exhaust gas produced by the combustion chambers 112 flows through the exhaust manifold 140 via the exhaust ports 209 and then to the two outlets 142, 144 of the exhaust manifold 140. The portion of the exhaust gas that flows through the first outlet 142 of the exhaust manifold 140 flows to the turbine 424. This portion of the exhaust gas rotates the blades in the turbine 424 so that the turbine 424 drives the compressor 414. The exhaust gas exiting the turbine 424 flows to the aftertreatment device 426, which may remove particulates and other pollutants from the exhaust flow, and then the exhaust gas is output from the exhaust recirculation system 400.

The remaining portion of the exhaust gas flows through the second outlet 144 of the exhaust manifold 140 and is directed to the EGR manifold 130 to be recirculated back into the engine 110. The recirculated exhaust gas flows to the filter 432, which removes particulates from the exhaust flow to output clean exhaust gas. Then, the clean recirculated exhaust gas is cooled by the cooler 434. The clean and cooled recirculated exhaust gas is directed to the EGR manifold 130 where it is supplied to the combustion chambers 112 via the EGR ports 210 according to the valve actuation procedures described above.

As a result, the exhaust manifold 140 outputs two separate flows: one flow of exhaust gas, which flows through the first exhaust system 420 and is released from the exhaust recirculation system 400, and another flow of exhaust gas, which recirculates through the second exhaust system 430, is directed to the EGR manifold 130, and is supplied to the combustion chambers 112.

The exemplary exhaust recirculation system 400 shown in FIG. 2 may be characterized as being a high pressure loop system. The pressure of the exhaust gas leaving the combustion chambers 112 of the engine 110 is relatively high in the exhaust manifold 130, and the pressure remains relatively high as the exhaust gas recirculates and enters the EGR manifold 130.

In accordance with another exemplary embodiment, the operation of an exhaust recirculation system 500, which includes the engine 110 operating as described above, will now be explained with reference to FIG. 3. The air induction system 410 shown in FIG. 3 is identical to the air induction system 410 shown in FIG. 2 and described above. The air induction system 410 supplies cooled and compressed air to the intake manifold 120, which directs the cooled and compressed air through the intake ports 208 to the combustion chambers 112.

In the exemplary exhaust recirculation system 500 shown in FIG. 3, the exhaust manifold 140 has the single outlet 146. Therefore, the entire flow of exhaust gas is supplied to the turbine 424, which drives the compressor 414 as described above. Then, the exhaust gas flows to the filter 432, which removes particulates from the exhaust gas to output clean exhaust gas. The clean exhaust gas then flows to the port 522 where the flow of clean exhaust gas divides so that a portion of the clean exhaust gas is recirculated toward the EGR manifold 130 and the remaining portion of the clean exhaust gas bypasses the port 522 and is released from the exhaust recirculation system 500. The portion of the clean exhaust gas that is recirculated is cooled by the cooler 434 before flowing to the EGR manifold 130. The cooler 434 cools the clean recirculated exhaust gas to provide clean and cooled recirculated exhaust gas to the EGR manifold 130, where the clean and cooled recirculated exhaust gas is supplied to the combustion chambers 112 via the EGR ports 210 according to the valve actuation procedures described above.

The exemplary exhaust recirculation system 500 shown in FIG. 3 may be characterized as a low pressure loop system. The pressure of the exhaust gas leaving the combustion chambers 112 of the engine 110 is relatively high in the exhaust manifold 140, but decreases after passing through the turbine 424. Therefore, the pressure of the recirculated exhaust gas supplied to the EGR manifold 130 is relatively low, e.g., near ambient.

Several advantages over the prior art may be associated with the engine 110 and the exhaust recirculation systems 400, 500 described above. For example, an exhaust recirculation system in accordance with the exemplary embodiments may include an engine with an EGR valve in addition to an intake valve and an exhaust valve associated with each combustion chamber. The EGR valve may be controlled to allow a proper amount of recirculated exhaust gas to enter the combustion chamber so that NOx emissions may be reduced. Instead of recirculating the exhaust gas to the intake air supply, recirculated exhaust gas is supplied directly to the combustion chamber, thereby eliminating the need to provide a device, such as a throttle valve or venturi, for forcing the recirculated exhaust gas into the flow of intake air, which causes losses in the system. As a result, the exhaust recirculation system may be more efficient, and the engine may be more fuel efficient. Furthermore, the exhaust recirculation system may provide higher concentrations of recirculated exhaust gas into the combustion chamber, especially when the amount of recirculated exhaust gas is increased.

An exhaust recirculation system in accordance with the exemplary embodiments may also include separate valve actuators for the intake and EGR valves and a controller for determining valve actuation conditions for the intake and EGR valves, e.g., when and for how long to open the valves. A proper balance between recirculated exhaust gas and intake air may be provided at different operating conditions. Also, there may be times when there is no substantial overlap between the opening of the intake and EGR valves. Pressure measurements may be used to determine the order for supplying intake air and recirculated exhaust gas to the combustion chambers by determining which associated manifold has a lower pressure. Therefore, backflow through the intake ports and the EGR ports may be reduced, thereby allowing more efficient operation. Furthermore, in diesel engines and other engines in which it varies whether the pressure of the intake air is lower or higher than the pressure of the recirculated exhaust gas, the actuation order determining process allows the exhaust recirculation system to operate more efficiently.

An exhaust recirculation system in accordance with the exemplary embodiments may include a device, such as a turbine in a turbocharger, for extracting energy from the flow of exhaust gas. As a result, energy may be recovered that would otherwise be lost when releasing the exhaust gas into the atmosphere. At least a portion of the output from the energy extraction device may be used to compress the intake air supplied to the combustion chamber. As a result, the recirculated exhaust gas is at a lower pressure after being sent through the energy extraction device. However, the actuation order determining process enables the controller to determine whether to open the EGR valve or the intake valve first to ensure more efficient operation and to prevent backflow through the EGR and intake ports.

An exhaust recirculation system in accordance with the exemplary embodiments may include an aftertreatment device such as a filter for removing particulates to produce clean recirculated exhaust gas. As the recirculated gas passes through the aftertreatment device, which includes the filter and/or one or more other aftertreatment components, particulates, NOx, and/or other pollutants may be removed from the exhaust gas. Since the clean exhaust gas may also be cooled, these exhaust recirculation systems are also known as a clean and cooled exhaust gas recirculation ("clean and cooled EGR") system. Carbon particles and other pollutants contained in the exhaust gas are prevented from recirculating and being introduced into the engine. The exhaust gas recirculation system, therefore, protects the engine against problems caused by inhalation or intake of these carbon particles and other pollutants.

It will be apparent to those skilled in the art that various modifications and variations can be made to the exhaust recirculation system. Other embodiments will be apparent to those skilled in the art from consideration of the specification and practice of the disclosed exhaust recirculation system. It is intended that the specification and examples be considered as exemplary only, with a true scope being indicated by the following claims and their equivalents.

What is claimed is:

1. An exhaust recirculation system comprising:
    a power source including at least one combustion chamber, the at least one combustion chamber including an intake port, an exhaust port, and an exhaust recirculation port;
    an intake valve configured to open the intake port;
    an exhaust valve configured to open the exhaust port to output exhaust gas from the at least one combustion chamber;
    an energy extraction device configured to receive the exhaust gas, extract energy from the exhaust gas, and direct the exhaust gas to the exhaust recirculation port; and
    an exhaust recirculation valve configured to open the exhaust recirculation port to receive the exhaust gas from the energy extraction device.

2. The exhaust recirculation system of claim 1, wherein the energy extraction device is a turbine propelled by the exhaust gas to drive a compressor, and the compressor is configured to receive and compress intake air directed to the intake port.

3. The exhaust recirculation system of claim 1, further including:
    a first valve actuator for actuating the intake valve;
    a second valve actuator for actuating the exhaust recirculation valve;
    a controller configured to determine at least one valve actuation condition of each of the intake valve and the exhaust recirculation valve, the controller being configured to deliver signals to the first and second valve actuators indicative of the respective at least one valve actuation condition of the intake valve an the exhaust recirculation valve.

4. The exhaust recirculation system of claim 1, wherein the power source is an internal combustion diesel engine.

5. The exhaust recirculation system of claim 1, further including:
    a sensor configured to sense a condition of the exhaust recirculation system; and
    a controller connected to the intake valve, the exhaust recirculation valve, and the sensor, the controller being configured to determine at least one valve actuation condition for controlling actuation of each of the intake valve and the exhaust recirculation valve.

6. The exhaust recirculation system of claim 5, wherein the sensed condition includes a sensed condition of at least one of the exhaust gas and intake air directed to the intake port.

7. A method for recirculating exhaust gas comprising:
operating an intake valve to open an intake port of a combustion chamber during an intake stroke;
    operating an exhaust valve to open an exhaust port of the combustion chamber to output exhaust gas from the combustion chamber;
    directing the exhaust gas from the exhaust port to an exhaust recirculation port of the combustion chamber;
    operating an exhaust recirculation valve to open the exhaust recirculation port during the intake stroke, one of the intake and exhaust recirculation valves being a first actuated valve, the other of the intake and exhaust recirculation valves being a second actuated valve, the second actuated valve beginning to open the port associated with the second actuated valve after the first actuated valve begins closing the port associated with the first actuatedvalve; and using a controller to determine at least one valve actuation condition for controlling actuation of the exhaust recirculation valve.

8. The method of claim 7, wherein the combustion chamber is provided in an internal combustion diesel engine.

9. The method of claim 7, further including: determining at least one valve actuation condition for controlling actuation of the intake valve determining a sensed condition of intake air directed to the intake port; and determining a sensed condition of the exhaust gas, wherein the determining of the at least one valve actuation condition for controlling actuation of the intake and exhaust recirculation valves is based on the sensed conditions of the intake air and the exhaust gas.

10. The method of claim 9, wherein: the sensed conditions are sensed pressures; and the determining of the at least one valve actuation condition includes determining that the exhaust recirculation valve opens before the intake valve if the sensed pressure of the exhaust gas is lower than the sensed pressure of the intake air.

11. A method for recirculating exhaust gas comprising:
operating an intake valve to open an intake port of a combustion chamber;
operating an exhaust valve to open an exhaust port of the combustion chamber;
directing exhaust gas from the exhaust port to an exhaust recirculation port of the combustion chamber;
operating an exhaust recirculation valve to open the exhaust recirculation port to allow the exhaust gas to enter the combustion chamber; and
determining at least one valve actuation condition for controlling actuation of each of the intake valve and the exhaust recirculation valve.

12. The method of claim 11, wherein the intake and exhaust recirculation valves open the respective ports substantially during an intake stroke, and the exhaust valve opens the exhaust port substantially during an exhaust stroke.

13. The method of claim 11, wherein the at least one valve actuation condition includes valve actuation periods for the intake valve and the exhaust recirculation valve and valve actuation start times for the intake valve and the exhaust recirculation valve.

14. The method of claim 1, further including reducing an amount of particulates in the exhaust gas before directing the exhaust gas to the exhaust recirculation port.

15. The method of claim 11, wherein the combustion chamber is provided in an internal combustion diesel engine.

16. The method for recirculating exhaust gas of claim 11, wherein a substantial portion of the exhaust gas is allowed to enter the combustion chamber through the exhaust recirculation port.

17. The method for recirculating exhaust gas of claim 11, wherein the determining of the at least one valve actuation condition is performed using a controller.

18. The method for recirculating exhaust gas of claim 11, wherein the exhaust recirculation port is configured to allow the exhaust gas to directly enter the combustion chamber.

19. The method of claim 11, wherein one of the intake and exhaust recirculation valves is a first actuated valve, the other of the intake and exhaust recirculation valves is a second actuated valve, the second actuated valve begins opening the port associated with the second actuated valve after the first actuated valve begins closing the port associated with the first actuated valve.

20. The method of claim 19, wherein the second actuated valve begins opening the port associated with the second actuated valve after the first actuated valve has substantially closed the port associated with the first actuated valve.

21. The method of claim 11, further including extracting energy from the exhaust gas before directing the exhaust gas to the exhaust recirculation port.

22. The method of claim 21, further including using the extracted energy to compress intake air directed to the intake port.

23. The method for recirculating exhaust gas of claim 11, wherein the actuation of one of the exhaust recirculation valve and the intake valve is permitted to vary with respect to the actuation of the other of the exhaust recirculation valve and the intake valve.

24. The method for recirculating exhaust gas of claim 23, further including determining an actuation order for the actuation of the exhaust recirculation valve and the intake valve.

25. The method of claim 11, further including: determining a sensed condition of the exhaust gas; and determining a sensed condition of intake air directed to the intake port, the determining of the at least one valve actuation condition being based on the sensed conditions of the intake air and the exhaust gas.

26. The method of claim 25, further including comparing the sensed conditions to determine which one of the intake and exhaust recirculation valves to open first.

27. The method of claim 26, wherein:
the sensed conditions are sensed pressures; and
the determining of the at least one valve actuation condition includes determining that the exhaust recirculation valve opens before the intake valve if the sensed pressure of the exhaust gas is lower than the sensed pressure of the intake air.

* * * * *